(12) United States Patent
Ye et al.

(10) Patent No.: US 12,232,113 B2
(45) Date of Patent: Feb. 18, 2025

(54) REDUCED SENSING SCHEMES FOR SIDELINK ENHANCEMENT

(71) Applicant: Apple Inc., Cupertino, CA (US)

(72) Inventors: Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Jia Tang, San Jose, CA (US); Oghenekome Oteri, San Diego, CA (US); Weidong Yang, San Diego, CA (US); Zhibin Wu, Los Altos, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 17/364,674

(22) Filed: Jun. 30, 2021

(65) Prior Publication Data

US 2022/0046620 A1 Feb. 10, 2022

Related U.S. Application Data

(60) Provisional application No. 63/062,303, filed on Aug. 6, 2020.

(51) Int. Cl.
*H04W 72/20* (2023.01)
(52) U.S. Cl.
CPC .................................. *H04W 72/20* (2023.01)

(58) Field of Classification Search
None
See application file for complete search history.

(56) References Cited

U.S. PATENT DOCUMENTS

| | | | |
|---|---|---|---|
| 11,924,676 B2 | 3/2024 | Shilov et al. | |
| 2021/0007096 A1 | 1/2021 | Huang et al. | |
| 2021/0314821 A1 | 10/2021 | Huang et al. | |
| 2021/0368479 A1* | 11/2021 | Yu | H04W 52/0216 |
| 2021/0385696 A1* | 12/2021 | Yang | H04L 1/1812 |
| 2022/0046620 A1 | 2/2022 | Ye et al. | |
| 2023/0050353 A1* | 2/2023 | Miao | H04W 74/0808 |
| 2023/0063472 A1* | 3/2023 | Freda | H04W 76/28 |
| 2023/0084593 A1* | 3/2023 | Hoang | H04W 52/0225 370/311 |
| 2023/0087401 A1 | 3/2023 | Shin et al. | |

FOREIGN PATENT DOCUMENTS

| | | |
|---|---|---|
| CN | 109804682 A | 5/2019 |
| CN | 111886916 A | 11/2020 |
| CN | 112312526 A | 2/2021 |

OTHER PUBLICATIONS

"3rd Generation Partnership Project; Technical Specification Group Radio Access Network; NR; Physical layer procedures for control (Release 16)," 3GPP TS 38.213 V16.2.0, 5G, Jun. 2020, 176 pages.

(Continued)

*Primary Examiner* — Nguyen H Ngo
(74) *Attorney, Agent, or Firm* — Kilpatrick Townsend & Stockton LLP

(57) ABSTRACT

The present application relates to devices and components including apparatus, systems, and methods to provide reduced sensing schemes to facilitate sidelink transmissions.

20 Claims, 9 Drawing Sheets

(56) References Cited

OTHER PUBLICATIONS

"3rd Generation Partnership Project; Technical Specification Group Radio Access Network; NR; Physical layer procedures for data (Release 16)," 3GPP TS 38.214 V16.2.0, 5G, Jun. 2020, 164 pages.
"3rd Generation Partnership Project; Technical Specification Group Radio Access Network; NR; Radio Resource Control (RRC) protocol specification (Release 16)," 3GPP TS 38.331 V16.1.0, 5G, Jul. 2020, 906 pages.
"Revised SID: Study on NR V2X," LG Electronics, 3GPP TSG RAN Meeting #81, RP-182111 (revision of RP-182080), Sep. 2018, 6 pages.
"Revised SID: Study on NR V2X," LG Electronics, 3GPP TSG RAN Meeting #82, RP-182491 (revision of RP-182080), Dec. 2018, 6 pages.
"New WID on 5G V2X with NR sidelink," LG Electronics, 3GPP TSG RAN Meeting #83, RP-190766, Mar. 2019, 8 pages.
"Revised WID on 5G V2X with NR sidelink," LG Electronics, 3GPP TSG RAN Meeting #84, RP-190984 (revision of RP-190766), Jun. 2019, 8 pages.
"Revised WID on 5G V2X with NR sidelink," LG Electronics, 3GPP TSG RAN Meeting #85, RP-191723 (revision of RP-190984), Sep. 2019, 8 pages.
"3rd Generation Partnership Project; Technical Specification Group Services and System Aspects; Study on enhancement of 3GPP Support for 5G V2X Services (Release 16)," 3GPP TR 22.886 V16.2.0, 5G, Dec. 2018, 75 pages.
"3rd Generation Partnership Project; Technical Specification Group Services and System Aspects; Enhancement of 3GPP support for V2X scenarios; Stage 1 (Release 16)," 3GPP TS 22.186 V16.2.0, 5G, Jun. 2019, 18 pages.
3GPP TS 38.213 V16.5.0, 3rd Generation Partnership Project; Technical Specification Group Radio Access Network; NR; Physical Layer Procedures for Control (Release 16), Mar. 2021, 183 pages.
3GPP TS 38.214 V16.5.0, 3rd Generation Partnership Project; Technical Specification Group Radio Access Network; NR; Physical layer Procedures for Data (Release 16), Mar. 2021, 171 pages.
3GPP TS 38.321 V16.4.0, 3rd Generation Partnership Project, Technical Specification Group Radio Access Network, NR; Medium Access Control (MAC) Protocol Specification (Release 16), Mar. 2021, 157 pages.
3GPP TS 38.331 V16.4.1, 3rd Generation Partnership Project; Technical Specification Group Radio Access Network; NR; Radio Resource Control (RRC) Protocol Specification (Release 16), Mar. 2021, 949 pages.
3rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V16.4.0, Mar. 2021, 1087 pages.
FL Summary for AI 8.11.1.1—Resource Allocation for Power Saving, OPPO, R1-2101412, 3GPP TSG RAN WG1, Jan. 25-Feb. 5, 2021, 92 pages.
Resource Allocation Mechanisms For Power Saving, Ericsson, 3GPP TSG-RAN WG1 Meeting #104-e, R1-2100687, Jan. 26-Feb. 5, 2021, 16 pages.
European Patent Application No. 21935472.7, Partial Supplementary European Search Report, Mar. 11, 2024, 11 pages.
International Patent Application No. PCT/CN2021/085506, International Preliminary Report on Patentability, Oct. 19, 2023, 7 pages.
International Patent Application No. PCT/CN2021/085506, International Search Report and Written Opinion, Jan. 12, 2022, 13 pages.
U.S. Appl. No. 17/442,486, Non-Final Office Action, Jun. 12, 2024, 26 pages.
European Patent Application No. 21935472.7, Extended European Search Report, Jun. 4, 2024, 9 pages.

* cited by examiner

… (1)

REDUCED SENSING SCHEMES FOR SIDELINK ENHANCEMENT

CROSS REFERENCE TO RELATED APPLICATIONS

This application claims the benefit of U.S. Provisional Application No. 63/062,303, filed Aug. 6, 2020, which is hereby incorporated by reference in its entirety for all purposes.

BACKGROUND

A user equipment (UE) may communicate directly with another UE over a sidelink. Prior to transmitting over the sidelink, the UE may need to perform a sensing/monitoring operation.

DETAILED DESCRIPTION

Figure 1:
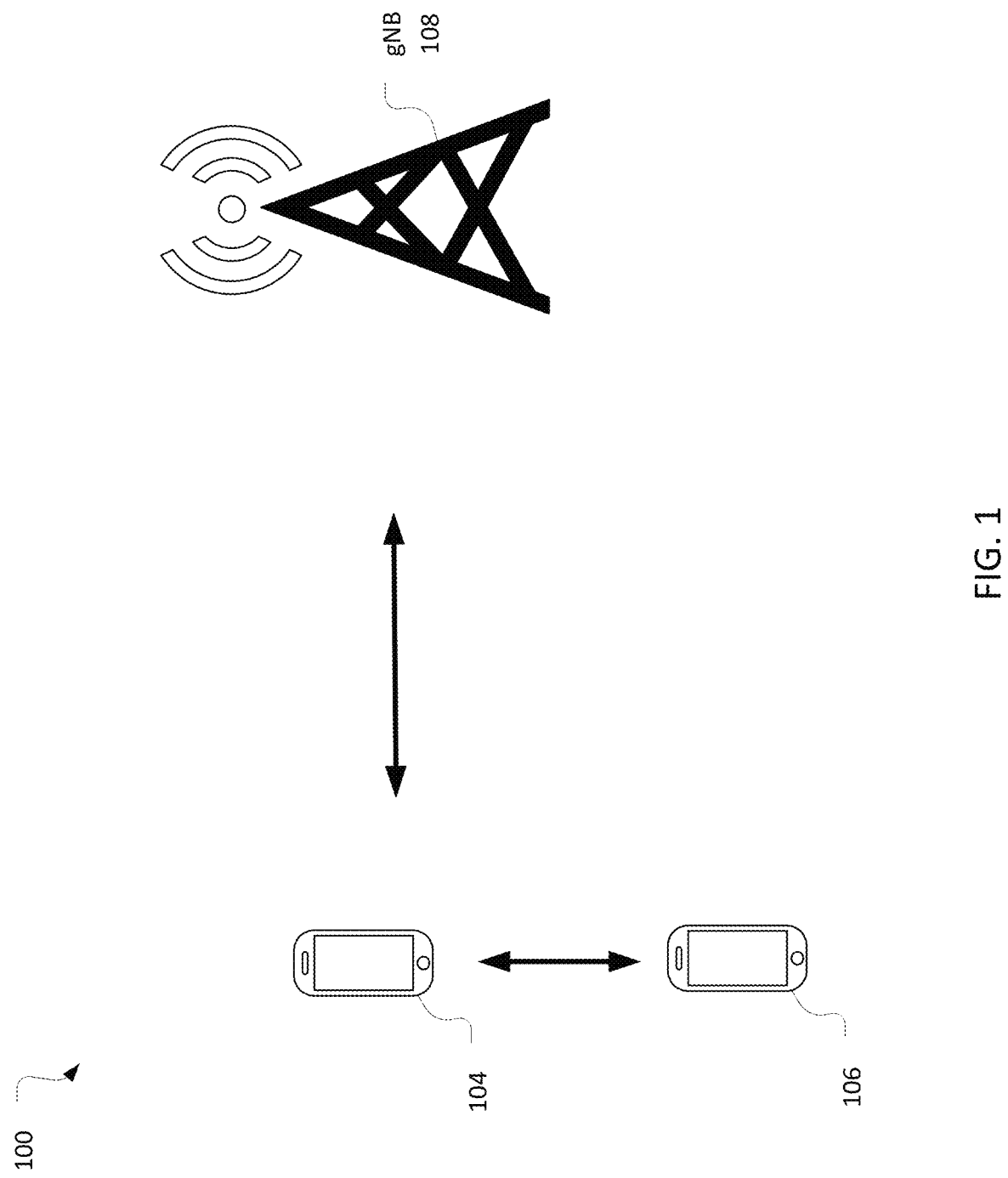
FIG. 1 illustrates a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104, UE 106, and a base station 108. The base station 108 may provide a wireless access cell through which the UEs 104/106 may communicate with the base station 108. In some embodiments, the base station 108 is a gNB that provides 3GPP New Radio (NR) cell. In other embodiments, the base station 108 is an eNB that provides an LTE cell. The air interfaces over which the UEs 104/106 and base station 108 communicate may be compatible with 3GPP technical specifications, such as those that define Fifth Generation (5G) NR system standards.

The UEs 104/106 may also communicate directly with one another over a sidelink interface. The sidelink interface may alternatively be referred to as a ProSe interface, device-to-device (D2D) interface, or a PC5 interface or reference point. In some embodiments, the network environment 100 may be deployed within a vehicular communication system. In a vehicular communication system the UEs 104/06 may communicate with one another using cellular vehicle-to-everything (V2X) communications. V2X may involve vehicle-to-vehicle (V2V), vehicle-to-infrastructure (V2I), vehicle-to-network (VTN), or vehicle-to-pedestrian (V2P) communications.

While FIG. 1 depicts the UEs 104/106 as mobile phones, the UEs 104/106 may be any type of user equipment, such as those described below with respect to UE 800 of FIG. 8.

The UEs 104/106 may communicate with one another using a sidelink resource pool. The sidelink resource pool may include a set of time/frequency resources for sidelink transmission or reception. The sidelink resource pool may be used for all unicast, groupcast, or broadcast communications for a given UE. In the frequency domain, the resource pool may include a plurality of subchannels, with each sub channel including a plurality of physical resource blocks (PRBs). In various embodiments, a subchannel may include 10, 12, 15, 20, 25, 50, 75, or 100 PRBs, for example. In some embodiments, the PRBs of a subchannel, and the subchannels of a resource pool may be contiguous.

In the time domain, a sidelink resource pool may include a plurality of slots, which may be contiguous or noncontiguous. In some embodiments, the slots for a sidelink resource pool may be configured by, for example, a bitmap transmitted by the base station 108 to indicate which slots are part of a sidelink resource pool. The bitmap may have a periodicity of 10,240 ms and a bitmap length between 10-160. In some embodiments, a physical slot may include all slots including non-sidelink slots, while a logical slot may only include slots in the resource pool. For example, consider a 10-bit bitmap as follows: [1, 1, 0, 1, 1, 0, 1, 1, 1, 1]. This bitmap indicates that 10 physical slots include 8 logical slots of a sidelink resource pool.

Resources of the sidelink may be allocated in a number of ways. For example, in a first mode (mode 1), the base station 108 may provide a sidelink grant to the UE 104 or 106. In a second mode (mode 2), a transmitting UE, for example, UE 104 or UE 106, may sense a channel and select its own resources for transmission.

Mode 2 resource allocation may include a plurality of operations including, for example: resource pool configuration; sensing; resource selection; and sidelink transmission.

Resource pool configuration may include the base station 108 providing the UEs 104/106 with the configuration information via control signaling, for example, radio resource control (RRC) signaling. Additionally/alternatively the configuration of the resource pool may include accessing predefined configuration information stored at the UEs 104/106.

After a UE is configured with a resource pool, a transmitting UE may perform a sensing procedure. Within a sensing window, the transmitting UE will decode sidelink control information (SCI) to determine a data priority indication and resource reservation information. The transmitting UE will also measure a channel quality metric such as, for example, reference signal received power (RSRP). The sidelink RSRP measurement may be based on physical sidelink control channel (PSCCH) demodulation reference signal (DMRS) or physical sidelink shared channel (PSSCH) DMRS.

Based on the sensing operation, the UE will select resources from within a resource selection window. The resources may be selected with the subchannel granularity in the frequency domain and a slot granularity in the time domain. The UE may identify candidate resources within the resource selection window. A resource of the resource selection window may be excluded from the candidate resources if it is reserved and its associated RSRP measurement is above a predetermined threshold. The UE may then select resources from the identified candidate resources. In some embodiments, the selection may be randomized.

The UE may then encode the sidelink data on the selected resources for transmission.

UEs, such as pedestrian UEs, may have reduced power capabilities as compared to vehicle-based UEs. Thus, alternative sensing modes are used to reduce power consumption.

One of these alternative sensing modes include a no-sensing mode, in which random resources are selected for transmission, and a partial-sensing mode.

In the partial sensing mode, the UE may be configured with monitoring periods by a higher-layer (for example, RRC layer) parameter, for example, a gap candidate sensing (GapCandidateSensing) parameter. The UE may also be configured with a minimum number of subframes in a resource selection window. These parameters may configure the monitoring periods and resource selection window with a repeating pattern of resources that may be monitored/selected. The pattern of resources in the monitoring period may be repeated in the resource selection window. The pattern of resources monitored/selected may be in a subset of the subframes of the resource pool. Time gaps between adjacent resources in the monitoring period and resource selection window will not be monitored/selected. In this manner, the partial sensing may reduce channel monitoring in the time domain.

The partial sensing mode may be suitable for periodic traffic as it is based on resource reservation periods to predict future resource occupation. The partial sensing mode may be further suitable for instances in which the resource pools have a limited number of subchannels, as monitoring all the subchannels at the subset of subframes may not be overly burdensome.

The partial sensing mode operation described above may be challenged by aspects of NR V2X systems. For example, NR V2X systems include a significant amount of aperiodic traffic that may not be accounted for through the partial sensing mode described above. Further, NR V2X systems may have resource pools with larger number of subchannels. The monitoring/sensing of all the subchannels in an NR sidelink slot may consume more energy than monitoring/sensing all the subchannels in an LTE sidelink subframe. In the subcarrier spacing for NR V2X may be larger than that for LTE V2X. Thus, the number of slots per second for NR V2X may be more than the number of subframes per second for LTE V2X. This may result in more monitoring/sensing trials being performed in NR V2X, which will lead to more energy consumption.

Various embodiments describe ways to improve mode 2 sidelink resource allocation. Embodiments may be beneficial to both NR V2X and LTE V2X.

Figure 2:
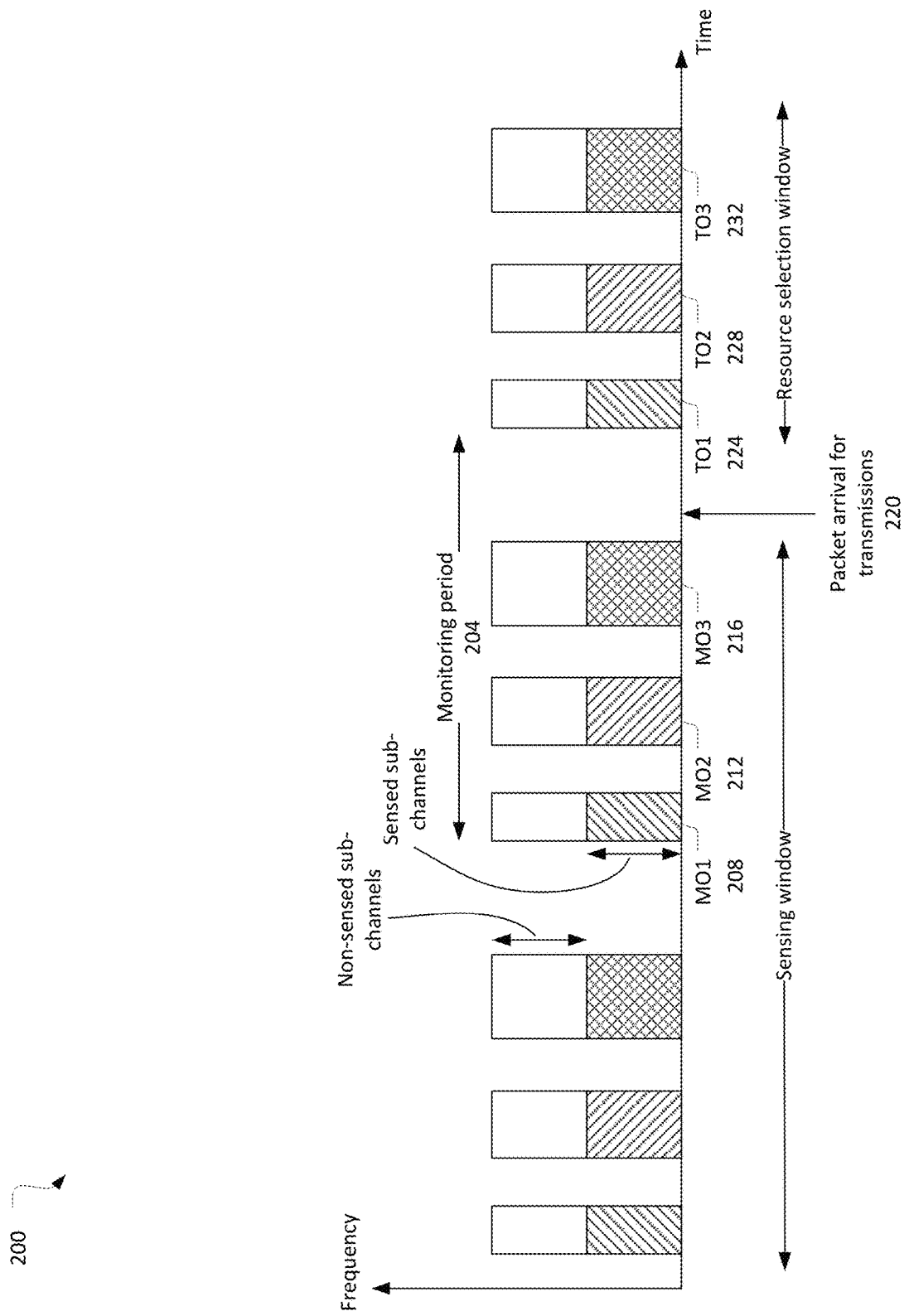
FIG. 2 illustrates a resource allocation operation based on partial sensing on resource pool dependent restricted set of subchannels, in accordance with some embodiments.

FIG. 2 illustrates resource allocation operation 200, in accordance with some embodiments. In the resource allocation operation 200, a transmitting UE may perform partial sensing on a restricted set of subchannels of a sidelink resource pool and, in this manner, reduce channel monitoring in the frequency domain as well as the timing domain.

The resource allocation operation 200 may include a sliding sensing window in which the transmitting UE will monitor/sense resources. The transmitting UE may be configured with a monitoring period configuration that provides a pattern of monitoring occasions. As shown, monitoring period 204 may include three monitoring occasions (MO); MO1 208, MO2 212, and MO3 216. Each of these monitoring occasions may include one or more slots. The resources within the restricted set of subchannels at a monitoring occasion may be referred to as a monitoring unit. The number of slots included in each monitoring occasion may be the same or different. The pattern of the monitoring occasions may be repeated throughout the sensing window. In each monitoring occasion, the transmitting UE may monitor/sense a subset of the subchannels of the resource pool. For example, the UE may decode a restricted set of PSCCH. This may result in fewer PSCCH decoding efforts in each monitoring occasion.

The transmitting UE may receive a packet with data/control information to be transmitted on the sidelink at 220. This event may be referred to as a resource selection trigger. The UE may then determine, based on the monitoring/sensing, candidates from resources in a resource selection window, which includes a pattern of resources (in both time and frequency domain) similar to the patterns used in the monitoring period. For example, a first transmission occasion (TO1) 224 may include the same number of slots and subchannels as MO1 208; TO2 228 may include the same number of slots and subchannels as MO2 212; and TO3 232 may include the same number of slots and subchannels as MO3 216. Thus, transmission units in the resource selection window correspond to monitoring units in the monitoring period. The UE may then select candidates for transmitting the packet that includes the data/control information.

With the exception of monitoring the subset of subchannels, rather than all of the subchannels of the resource pool, the monitoring/sensing and resource selection may be similar to that described above.

In some embodiments, the restricted set of subchannels that are to be monitored may be configured on a system-wide basis. The resource pool may be configured with a restricted set of monitoring subchannels that may be shared for all UEs using that resource pool. In various embodiments, the configuration of the restricted set of monitoring subchannels may be based on control signaling from the network, for example, base station 108 or pre-configuration information available to the UEs.

Figure 3:
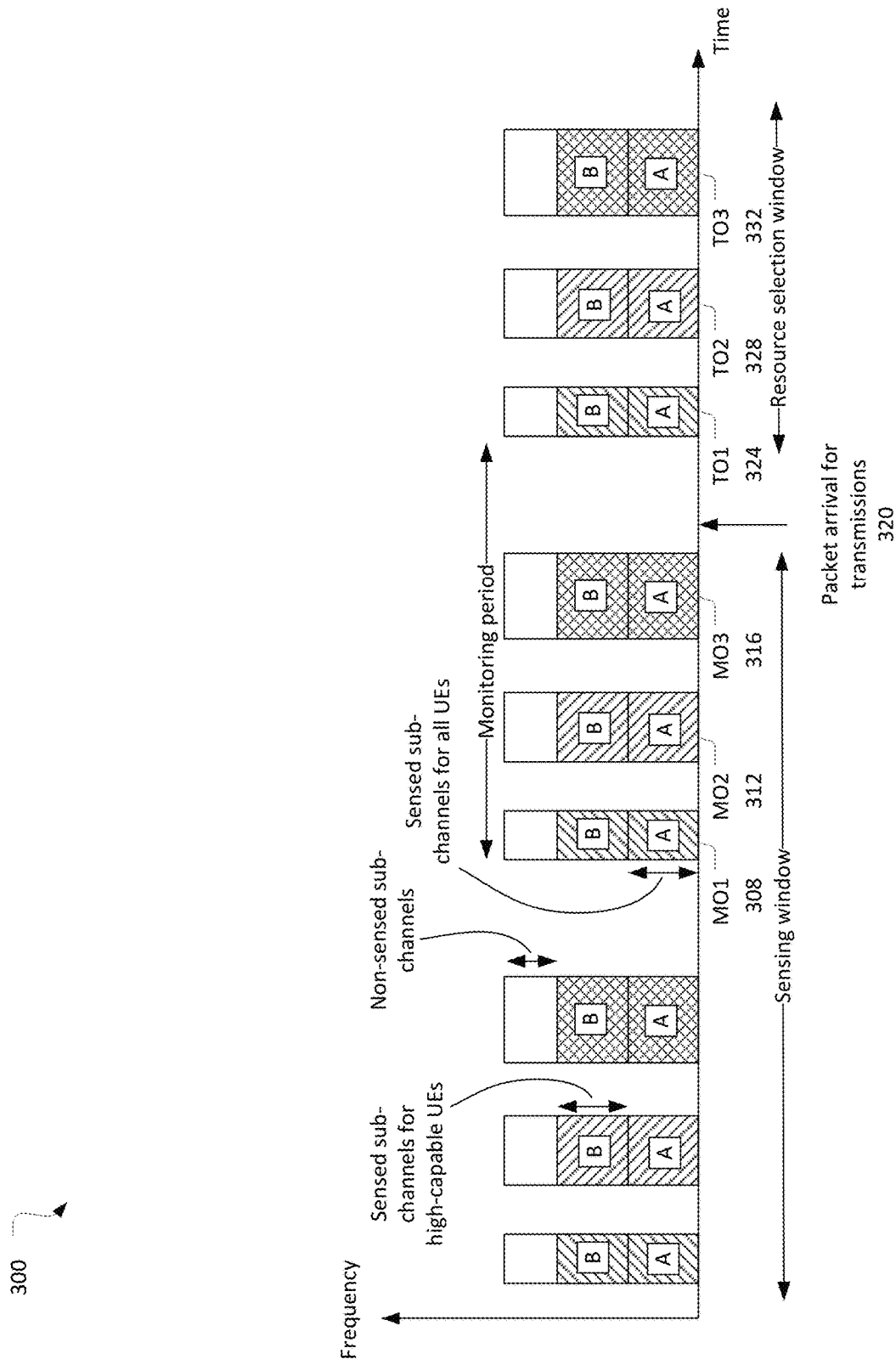
FIG. 3 illustrates a resource allocation operation based on partial sensing on UE dependent restricted set of subchannels, in accordance with some embodiments.

FIG. 3 illustrates resource allocation operation 300, in accordance with some embodiments. The resource allocation operation 300 may restrict sensing/monitoring in both the time and frequency domain similar to resource allocation operation 200. However, resource allocation operation 300 may include additional flexibility by providing variance among the monitored units that may be applied on a UE-specific basis.

In particular, the restricted set of subchannels may include set A subchannels, which may be sensed/monitored by all UEs, and set B subchannels, which may be sensed/monitored by some, but not all, UEs. For example, if the UE has a higher set of capabilities or is transmitting a certain type of data/control signals, the UE may be configured to sense/monitor both set A and set B subchannels. Alternatively, if the UE has a lower set of capabilities or is transmitting a different type of data/control signals, the UE may be configured to only send/monitor set A subchannels. The set of relevant UE capabilities may be power or processing capabilities.

In some embodiments, the UEs may be specifically configured to monitor set A, set B, or set A and B subchannels. In some embodiments, the UEs may determine which subchannels to monitor based on network conditions, data/control signaling to be transmitted, or other considerations.

While FIG. 3 illustrates the restricted set being divided into set A and set B, other embodiments may include the restricted set being divided into more than two sets.

The UE may select resources in the resource selection window based on the monitoring/sensing of the resources in the monitoring period. Similar to that described above, the pattern of resources (in both time and frequency domain) of the resource selection window may be similar to the patterns used in the monitoring period. For example, TO1 324 may include the same number of slots and subchannels as MO1 308; TO2 328 may include the same number of slots and subchannels as MO2 312; and TO3 332 may include the same number of slots and subchannels as MO3 316.

Figure 4:
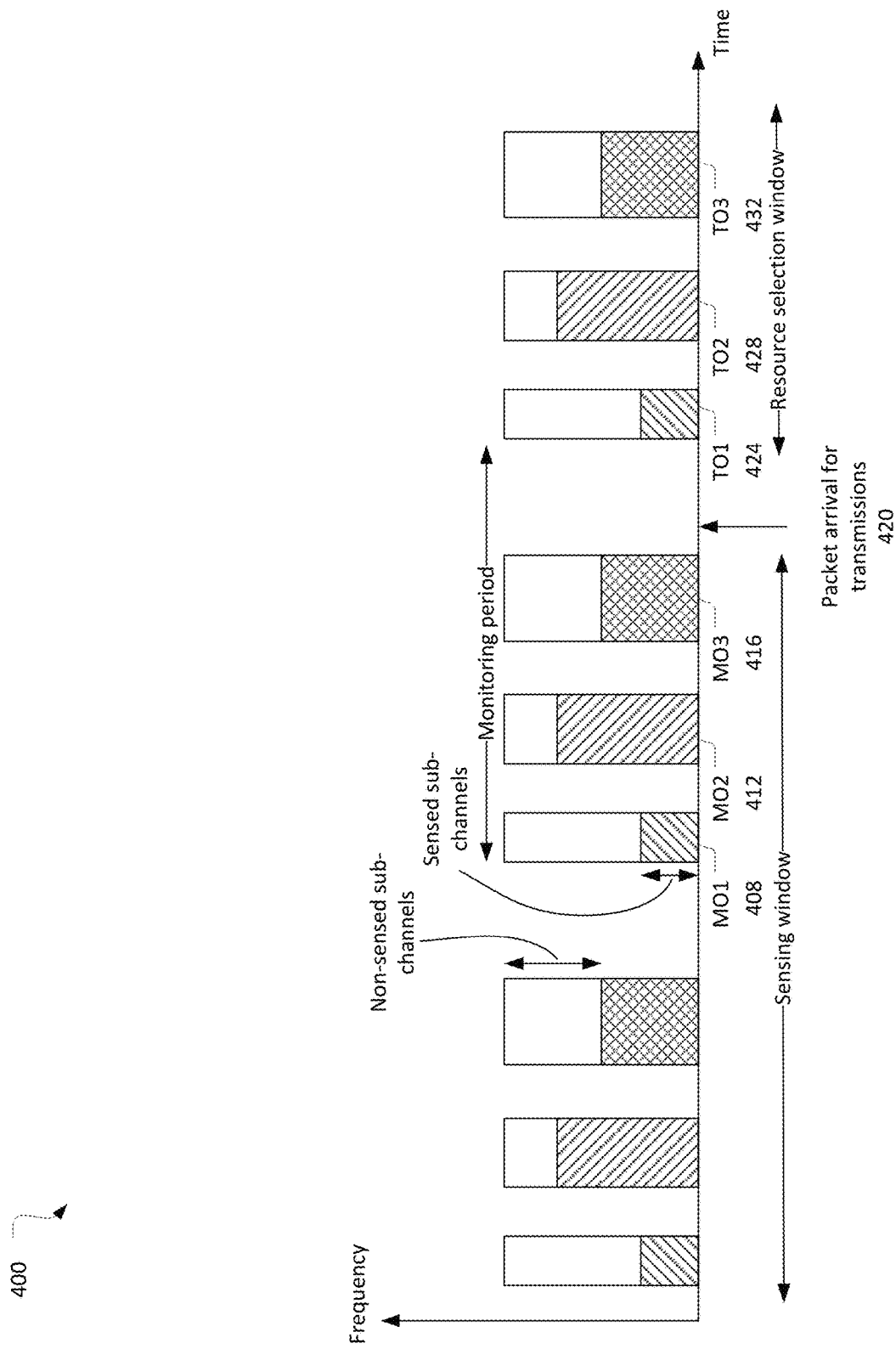
FIG. 4 illustrates a resource allocation operation based on partial sensing on monitoring occasion dependent restricted set of subchannels, in accordance with some embodiments.

FIG. 4 illustrates resource allocation operation 400, in accordance with some embodiments. The resource allocation operation 400 may restrict sensing/monitoring in both the time and frequency domain similar to resource allocation operations 200 and 300. However, resource allocation operation 400 may include additional flexibility by providing that the restricted set of subchannels may be time varying. For example, the restricted set of subchannels may be different in each of the monitoring occasions of a monitoring period.

The UE may select resources in the resource selection window based on the monitoring/sensing of the resources in the monitoring period. Similar to that described above, the pattern of resources (in both time and frequency domain) of the resource selection window may be similar to the patterns used in the monitoring period. For example, TO1 424 may include the same number of slots and subchannels as MO1 408; TO2 428 may include the same number of slots and subchannels as MO2 412; and TO3 432 may include the same number of slots and subchannels as MO3 416.

Figure 5:
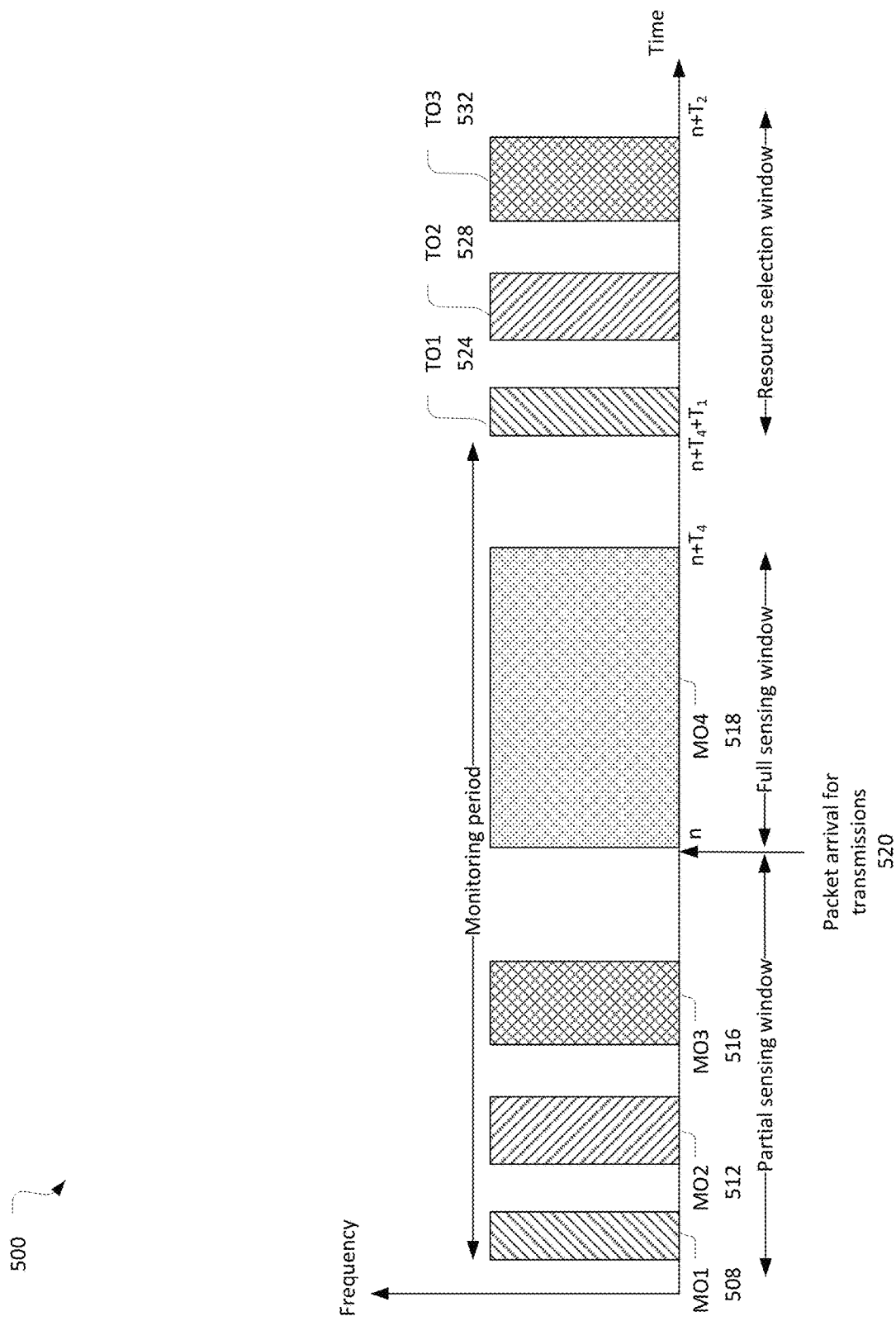
FIG. 5 illustrates a resource allocation operation with full sensing and partial sensing modes, in accordance with some embodiments.

FIG. 5 illustrates resource allocation operation 500, in accordance with some embodiments. To perform the resource allocation operation 500, the UE may utilize two sensing modes. The resource allocation operation 500 may begin with a UE performing a partial sensing mode in a partial sensing window. For example, the UE may sense/monitor MO1 508, MO2 512, and MO3 516. In this embodiment, all subchannels of the resource pool may be monitored. However, other embodiments may rely on sensing/monitoring restricted sets of the subchannels as described above.

At 520, the UE may receive the packet including data or control information to be transmitted on a sidelink. The UE may use the receipt of the packet as a trigger to switch from the partial sensing mode to a full sensing mode. The full sensing mode may last for a full sensing window during which the UE may sense/monitor all the subchannels and all of the slots of a resource pool. MO4 518 may, therefore, correspond to the entire full sensing window.

In some embodiments, the full channel sensing window may start immediately after the resource selection triggering, for example, arrival of the new packet for delivery at slot n. In other embodiments, additional UE preparation time for full channel sensing may be desired before the full channel sensing window. Referring to the additional UE preparation time as $T_{proc}$, the full channel sensing window may start at $n+T_{proc}$.

In some embodiments, a duration ($T_4$) of the full channel sensing window may be configured per resource pool.

In some embodiments, $T_4$ may be configured on a UE-specific basis. For example, $T_4$ may depend on a UE power capability with UEs having higher power capabilities being configured with a larger $T_4$ and UEs having lower power capabilities being configured with a smaller $T_4$.

In various embodiments, $T_4$ may be configured to be a number of logical or physical slots.

In some embodiments, $T_4$ may be based on characteristics (for example, quality of service parameters) of data/control information that is to be transmitted on the sidelink. For example, $T_4$ may be larger for transmissions of sidelink data with higher reliability or lower latency requirements, and $T_4$ may be smaller for transmissions of sidelink data with lower reliability or higher latency requirements. In some embodiments, $T_4$ may depend on a UE power capability with UEs having higher power capabilities being configured with a larger $T_4$ and UEs having lower power capabilities being configured with a smaller $T_4$.

In some embodiments, $T_4$ may be upper bounded by a resource reservation window size, for example, 32 slots.

The full channel sensing window may be $[n, n+T_4]$ or $[n+T_{proc}, n+T_{proc}+T_4]$.

The UE may delay the resource selection window to allow results from the full sensing mode to be used for its resource selection. In some embodiments, the resource selection window may be $[n+T_4+T_1, n+T_2]$. $T_2$ may be based on UE implementation and may be upper bounded by a packet delay budget (PDB) and lower bounded by $T_{2, min}$, which may be (pre)configured per priority from $\{1, 5, 10, 20\}*2\mu$slots, where $\mu$ is from subcarrier spacing. $T_1$ may also be based on UE implementation and may be upper bounded by $T_{proc,1}$ (UE processing time for resource selection and PSCCH/PSSCH preparation).

The UE may select available candidate resources in the resource selection window based on the sensing results from both partial sensing in partial sensing window and from full sensing in the full sensing window. The UE may exclude both periodically reserved resources determined from the partial-sensing mode and aperiodically reserved resources determined from the full-sensing mode.

In some embodiments, whether the UE is to perform the full channel sensing operation before the resource selection may be configured as an optional feature. This feature may be based on a resource pool configuration or resource pool preconfiguration, in which some resource pools support this feature while others do not. This feature may be based on a PC5-RRC (pre)configuration, where some sidelink session support this feature and others do not. This feature may be based on UE capability, for example, high-power capable UEs may support this feature, while low-power capable UEs do not. This feature may be based on features (for example, QoS) of data/control information to be transmitted, for example, this feature may be dynamically enabled for sidelink data with high reliability or large latency requirements and dynamically disabled for sidelink data with low reliability or low latency requirements.

In some embodiments, the first mode may be a no-sensing mode. For example, instead of relying on the partial sensing of the partial sensing window, the UE may not engage in any sensing/monitoring until detection of the packet arrival for transmission at 520.

In some embodiments, the full sensing window duration that follows a no sensing mode may be smaller than a full sensing window duration that follows a partial sensing mode (for additional power saving purposes). In other embodiments, the full sensing window duration that follows a no-sensing mode may be larger than the full-sensing window duration that follows the partial-sensing mode (to achieve better sensing performance).

Figure 6:
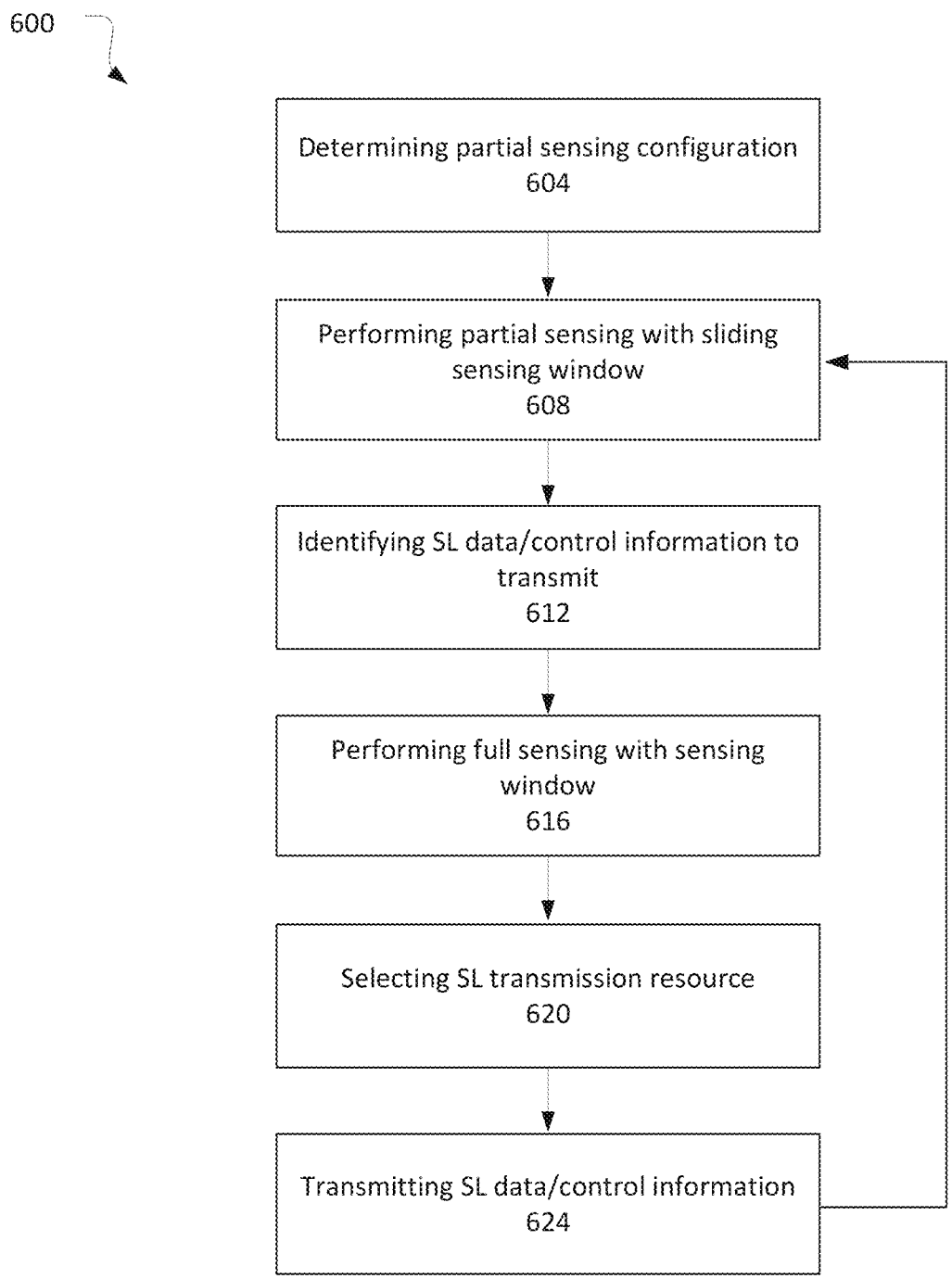
FIG. 6 illustrates an operational flow/algorithmic structure in accordance with joint full sensing mode and partial sensing mode, in accordance with some embodiments.

FIG. 6 may include an operation flow/algorithmic structure 600 in accordance with some embodiments. The operation flow/algorithmic structure 600 may be performed or implemented by a UE, such as, for example, UE 104/106 or 800; or components thereof, for example, baseband processor 804A.

The operation flow/algorithmic structure 600 may include at 604 determining a partial sensing configuration. This determining may be based on configuration signals from a base station or preconfigured information at the UE.

The operation flow/algorithmic structure 600 may further include at 608 performing a partial sensing with a sliding sensing window. The UE may sense subchannels (for example, all subchannels or a restricted set of subchannels) in one or more monitoring occasions within the sensing window.

The operation flow/algorithmic structure 600 may further include at 612 identifying sidelink data/control information to transmit. This event may trigger a resource selection and may further trigger the UE to transition from a partial-sensing mode to a full-sensing mode.

The operation flow/algorithmic structure 600 may further include at 616 performing full sensing during a full sensing window. In some embodiments, the UE may sense subchannels (for example, all subchannels or a restricted set of subchannels) in all slots of the full sensing window.

The operation flow/algorithmic structure 600 may further include at 620 selecting a sidelink transmission resources. This may include identifying candidates in a resource selection window (that includes a pattern similar to that of the partial sensing window) that exclude resources reserved for aperiodic traffic (detected during full-sensing mode) and resources reserved for periodic traffic (detected during partial-sensing mode).

The operation flow/algorithmic structure 600 may further include at 624 transmitting the sidelink data/control information.

Upon transmitting the sidelink data/control information, the operation flow/algorithmic structure 600 may loop back to performing the partial sensing with the sliding sensing window at 608.

Figure 7:
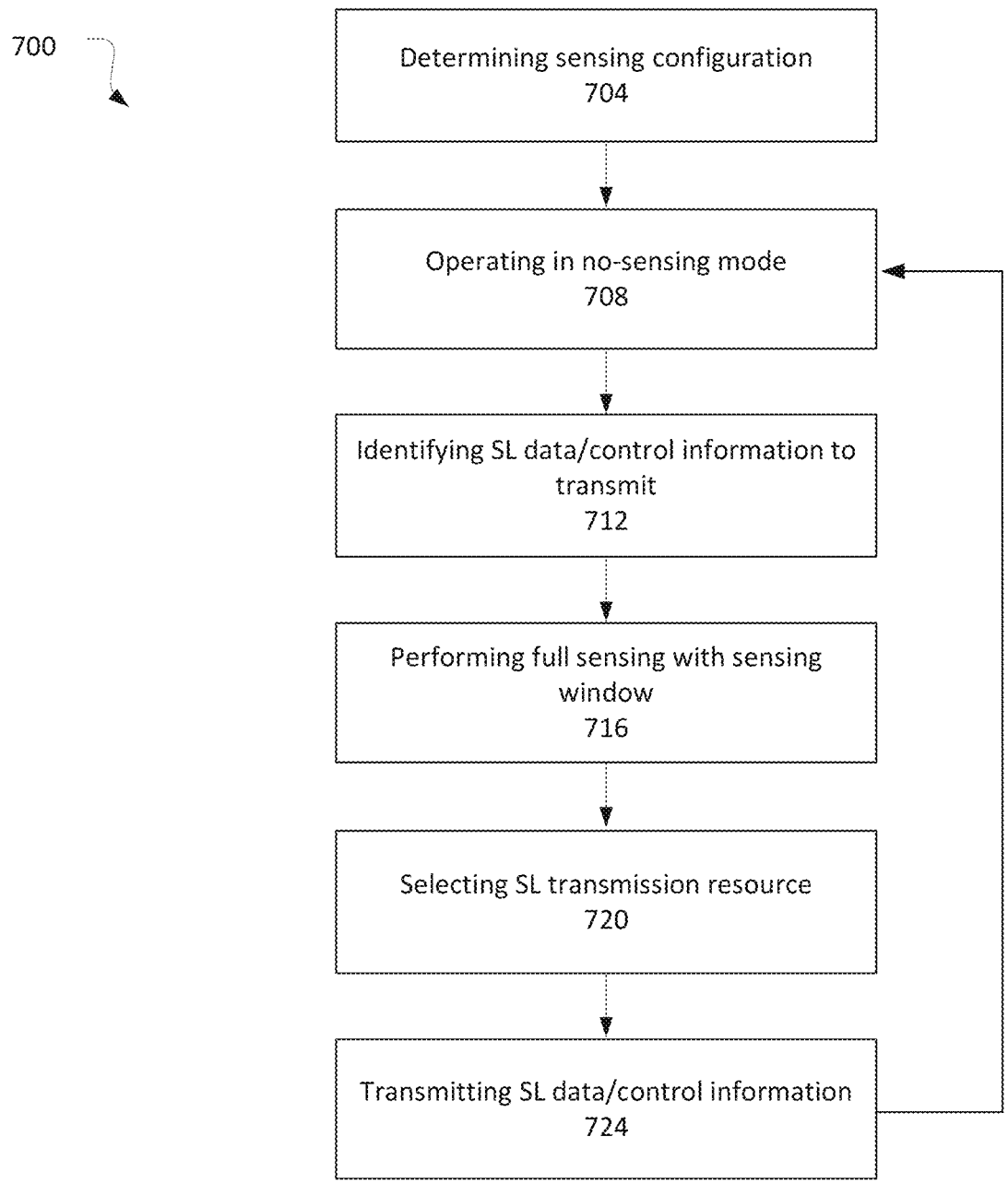
FIG. 7 illustrates an operational flow/algorithmic structure in accordance with joint full sensing mode and no sensing mode, in accordance with some embodiments.

FIG. 7 may include an operation flow/algorithmic structure 700, in accordance with some embodiments. The operation flow/algorithmic structure 700 may be performed or implemented by a UE such as, for example, UE 104/106 or 800; or components thereof, for example, baseband processor 804A.

The operation flow/algorithmic structure 700 may include at 704 determining a sensing configuration. This determining may be based on configuration signals from a base station or preconfigured information at the UE.

The operation flow/algorithmic structure 700 may further include at 708 operating in a no-sensing mode. No subchannels or monitoring occasions are monitored or sensed.

The operation flow/algorithmic structure 700 may further include at 712 identifying sidelink data/control information to transmit. This event may trigger a resource selection and may further trigger the UE to transition from the no-sensing mode to a full-sensing mode.

The operation flow/algorithmic structure 700 may further include at 716 performing full sensing during a full sensing window. In some embodiments, the UE may sense subchannels (for example, all subchannels or a restricted set of subchannels) in all slots of the full sensing window.

The operation flow/algorithmic structure 700 may further include at 720 selecting sidelink transmission resources. This may include identifying candidates in a resource selection window that exclude resources reserved for aperiodic traffic (detected during full-sensing mode).

The operation flow/algorithmic structure 700 may further include at 724 transmitting the sidelink data/control information.

Upon transmitting the sidelink data/control information, the operation flow/algorithmic structure 700 may loop back to the no-sensing mode at 708.

Figure 8:
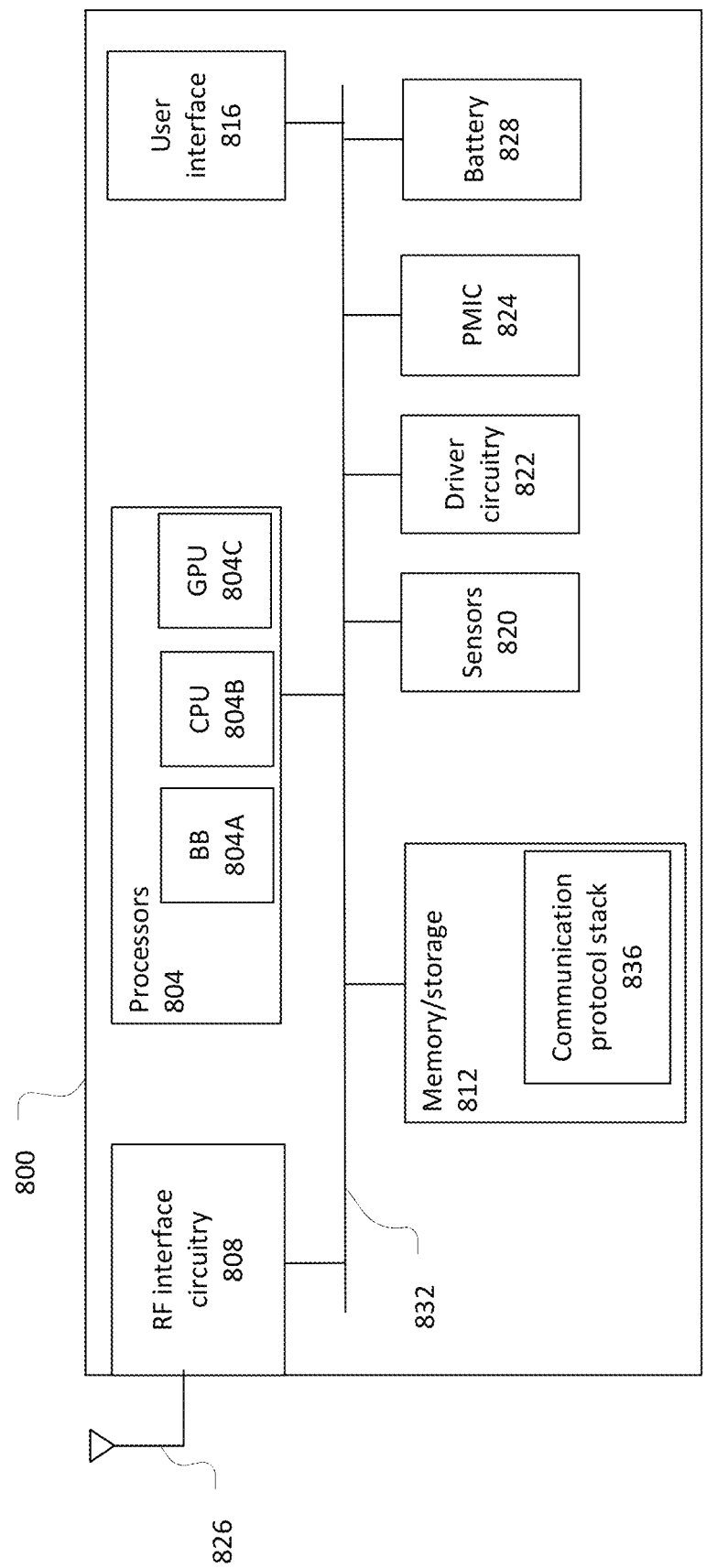
FIG. 8 illustrates a user equipment, in accordance with some embodiments.

FIG. 8 illustrates a UE 800, in accordance with some embodiments. The UE 800 may be similar to and substantially interchangeable with UE 104/106 of FIG. 1.

The UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a reduced capacity UE or NR-Light UE.

The UE 800 may include processors 804, RF interface circuitry 808, memory/storage 812, user interface 816, sensors 820, driver circuitry 822, power management integrated circuit (PMIC) 824, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 804A may also access group information 824 from memory/storage 812 to determine search space groups in which a number of repetitions of a PDCCH may be transmitted.

The memory/storage 812 may include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic-random access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 808 may include transceiver circuitry and radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 826 and proceed to filter and amplify (with a low-noise amplifier) the signal.

The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 826.

In various embodiments, the RF interface circuitry 808 may be configured to transmit/receive signals in a manner compatible with NR access technologies.

The antenna 826 may include a number of antenna elements that each convert electrical signals into radio waves to travel through the air and to convert received radio waves into electrical signals. The antenna elements may be arranged into one or more antenna panels. The antenna 826 may have antenna panels that are omnidirectional, directional, or a combination thereof to enable beamforming and multiple input, multiple output communications. The antenna 826 may include microstrip antennas, printed antennas fabricated on the surface of one or more printed circuit boards, patch antennas, phased array antennas, etc. The antenna 826 may have one or more panels designed for specific frequency bands including bands in FR1 or FR2.

The user interface circuitry 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs, or more complex outputs such as, display devices or touchscreens (for example, liquid crystal displays (LCDs), LED displays, quantum dot displays, projectors, etc.), with the output of characters, graphics, multimedia objects, and the like being generated or produced from the operation of the UE 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

In some embodiments, the PMIC 824 may control, or otherwise be part of, various power saving mechanisms of the UE 800. For example, if the platform UE is in an RRC Connected state, where it is still connected to the RAN node as it expects to receive traffic shortly, then it may enter a state known as Discontinuous Reception Mode (DRX) after a period of inactivity. During this state, the UE 800 may power down for brief intervals of time and thus save power. If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The UE 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 828 may power the UE 800, although in some examples the UE 800 may be mounted deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

Figure 9:
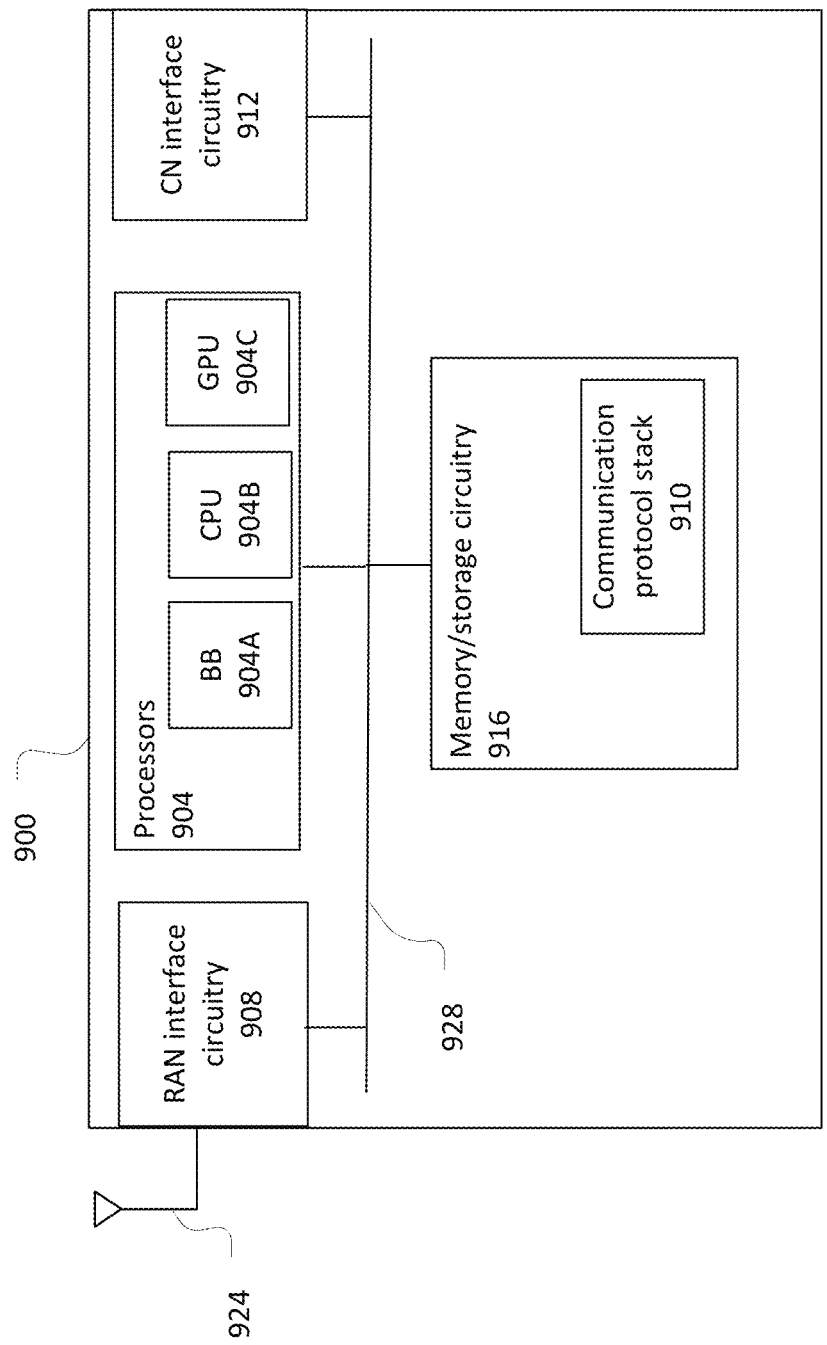
FIG. 9 illustrates a gNB, in accordance with some embodiments.

FIG. 9 illustrates a base station 900, in accordance with some embodiments. The base station 900 may similar to and substantially interchangeable with base station 108.

The base station 900 may include processors 904, RF interface circuitry 908, core network (CN) interface circuitry 912, and memory/storage circuitry 916.

The components of the base station 900 may be coupled with various other components over one or more interconnects 928.

The processors 904, RF interface circuitry 908, memory/storage circuitry 916 (including communication protocol stack 910), antenna 924, and interconnects 928 may be similar to like-named elements shown and described with respect to FIG. 8.

The CN interface circuitry 912 may provide connectivity to a core network, for example, a 5th Generation Core network (5GC) using a 5GC-compatible network interface protocol, such as carrier Ethernet protocols, or some other suitable protocol. Network connectivity may be provided to/from the base station 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: monitoring, in a monitoring occasion, a restricted set of subchannels of a sidelink resource pool; identifying sidelink data available for transmission; and selecting sidelink resources in the restricted set of subchannels for transmitting the sidelink data.

Example 2 includes a method of example 1 or some other example herein, wherein the restricted set is a first restricted set, the monitoring occasion is a first monitoring occasion within a monitoring period, and the method further comprises: monitoring the first restricted set of subchannels in a second monitoring occasion within the monitoring period.

Example 3 includes the method of example 1 or some other example herein, wherein the restricted set is a first restricted set, the monitoring occasion is a first monitoring occasion within a monitoring period, and the method further comprises: monitoring, in a second monitoring occasion, a second restricted set of subchannels of the sidelink resource pool, wherein the second restricted set is different from the first restricted set.

Example 4 includes the method of example 3 or some other example herein, wherein the first and second restricted sets include different numbers of subchannels.

Example 5 includes a method of example 1 or some other example herein, further comprising: determining a number of subchannels in the first restricted set based on a power capability of the UE.

Example 6 includes a method of example 1 or some other example herein, further comprising: monitoring a plurality of restricted sets of subchannels of the sidelink resource pool in a corresponding plurality of monitoring occasions of a monitoring period; and selecting sidelink resources in the plurality of restricted sets of subchannels in a corresponding plurality of transmission occasions in a resource selection window, wherein the plurality of monitoring occasions respectively correspond to the plurality of transmission occasions.

Example 7 includes a method of operating a UE, the method comprising: operating in a first mode that includes a partial sensing mode or a no-sensing mode; detecting a resource selection trigger; switching, based on detecting the resource selection trigger, from the first mode to a second mode that includes a full-sensing mode; sensing subchannels of a sidelink resource pool in the full-sensing mode; selecting sidelink transmission resources based on sensing the subchannels; and transmitting sidelink data in the sidelink transmission resources.

Example 8 includes the method of example 7 or some other example herein, wherein sensing the subchannels in the full-sensing mode comprises sensing all subchannels of the sidelink resource pool for a full sensing window.

Example 9 includes the method of example 8 or some other example herein, further comprising: receiving configuration information to configure a duration of the full sensing window.

Example 10 includes the method of example 8 or some other example herein, further comprising: determining a duration of the full sensing window based on UE power capability.

Example 11 includes the method of example 8 or some other example herein, further comprising: determining the full sensing window duration based on a quality of service parameter associated with the sidelink data.

Example 12 includes the method of example 8 or some other example herein, further comprising: starting the sensing of the subchannels a period of time after detecting the resource selection trigger, wherein the period of time is based on UE preparation for sensing of the subchannels in the full-sensing mode.

Example 13 includes the method of example 12 or some other example herein, wherein selecting the sidelink transmission resources comprises selecting the sidelink transmission resources in a resource selection window that starts a number of slots from an end of the full sensing window, wherein the number of slots is based on a UE processing time for selecting the sidelink transmission resources and preparing for transmitting of the sidelink data.

Example 14 includes the method of example 8 or some other example herein, further comprising: determining the full sensing window duration based on a latency requirement associated with the sidelink data.

Example 15 includes the method of example 7 or some other example herein, wherein the first mode includes the partial sensing mode and the method further comprises: sensing the subchannels of the sidelink resource pool in the partial sensing mode; and selecting the sidelink resources based further on results of the partial sensing mode.

Example 16 includes the method of example 15 or some other example herein, further comprising: determining periodically reserved resources from said sensing the subchannels in the partial sensing mode; determining aperiodically reserved resources from said sensing the subchannels in the full sensing mode; and selecting the sidelink resources in a manner to avoid periodically reserved resources and the aperiodically reserved resources.

Example 17 includes a method of operating a UE, the method comprising: detecting, while in a no-sensing mode, data or control information to be transmitted on a sidelink; entering, based on said detecting, a full-sensing mode; sensing all monitoring occasions within a full-sensing window while in the full-sensing mode; and selecting sidelink resources to transmit the data or control information on the sidelink.

Example 18 include the method of example 17 or some other example herein, wherein the full-sensing window starts immediately after detecting the data or control information, or starts a predetermined period of time after detecting the data or control information.

Example 19 includes the method of example 17 or some other example herein, further comprising determining a duration of the full-sensing window based on configuration information or the data or control information to be transmitted.

Example 20 includes a method of operating a base station, the method comprising: generating configuration information to configure a resource pool or UE for partial sensing of a restricted set of subchannels before performing a resource selection for a sidelink transmission; and transmitting the configuration information to a UE.

Example 21 includes the method of example 20 or some other example herein, wherein the configuration information is to configure the resource pool for partial sensing of the restricted set of subchannels before performing the resource selection for all UEs of a serving cell; and transmitting the configuration information to all UEs of the serving cell.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of examples 1-21, or portions thereof.

Example 27 may include a signal as described in or related to any of examples 1-21, or portions or parts thereof.

Example 28 may include a datagram, information element, packet, frame, segment, PDU, or message as described in or related to any of examples 1-21, or portions or parts thereof, or otherwise described in the present disclosure.

Example 29 may include a signal encoded with data as described in or related to any of examples 1-21, or portions or parts thereof, or otherwise described in the present disclosure.

Example 30 may include a signal encoded with a datagram, IE, packet, frame, segment, PDU, or message as described in or related to any of examples 1-21, or portions or parts thereof, or otherwise described in the present disclosure.

Example 31 may include an electromagnetic signal carrying computer-readable instructions, wherein execution of the computer-readable instructions by one or more processors is to cause the one or more processors to perform the method, techniques, or process as described in or related to any of examples 1-21, or portions thereof.

Example 32 may include a computer program comprising instructions, wherein execution of the program by a processing element is to cause the processing element to carry out the method, techniques, or process as described in or related to any of examples 1-21, or portions thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. One or more non-transitory, computer-readable media (NTCRM) having instructions that, when executed, cause processing circuitry to:
operate in a first mode that is a periodic partial sensing mode;
switch, based on detection of a resource selection trigger in a slot, from the first mode to a second mode that is a full-sensing mode;
sense, within a sensing window that starts a period of time after the slot, subchannels of a sidelink resource pool in the full-sensing mode to obtain results; and
select, based on the results, sidelink transmission resources for transmission of sidelink data.

2. The NTCRM of claim 1, wherein the sensing window is a full sensing window and, to sense the subchannels in the full-sensing mode, the processing circuitry is to sense all subchannels of the sidelink resource pool for the full sensing window to obtain the results.

3. The NTCRM of claim 2, wherein the instructions, when executed, further cause the processing circuitry to:
process configuration information that configures a duration of the full sensing window.

4. The NTCRM of claim 2, wherein the instructions, when executed, further cause the processing circuitry to: determine a duration of the full sensing window based on a user equipment (UE) power capability.

5. The NTCRM of claim 2, wherein the instructions, when executed, further cause the processing circuitry to: determine a duration of the full sensing window based on a quality of service parameter associated with the sidelink data.

6. The NTCRM of claim 2, wherein the period of time is based on user equipment (UE) preparation for sensing of the subchannels in the full-sensing mode.

7. The NTCRM of claim 6, wherein to select the sidelink transmission resources, the processing circuitry is further to select the sidelink transmission resources in a resource selection window that starts a number of slots from an end of the full sensing window, wherein the number of slots is based on a UE processing time for selecting the sidelink transmission resources and preparing for transmitting of the sidelink data.

8. The NTCRM of claim 2, wherein the instructions, when executed, further cause the processing circuitry to: determine the full sensing window duration based on a latency requirement associated with the sidelink data.

9. The NTCRM of claim 1, wherein the results are first results, and the instructions, when executed, further cause the processing circuitry to sense the subchannels of the sidelink resource pool in the first mode to obtain second results; and select the sidelink transmission resources based further on the second results.

10. The NTCRM of claim 9, wherein the instructions, when executed, further cause the processing circuitry to: determine periodically reserved resources based on the second results; determine aperiodically reserved resources based on the first results; and select the sidelink transmission resources in a manner to avoid periodically reserved resources and the aperiodically reserved resources.

11. The NTCRM of claim 1, wherein the results are first results, and the instructions, when executed, further cause the processing circuitry to sense the subchannels of the sidelink resource pool in the first mode to obtain second results; and select the sidelink transmission resources based further on the second results.

12. An apparatus comprising:
interface circuitry; and
processor circuitry coupled with the interface circuitry, the processor circuitry to:
perform a periodic partial-sensing operation;
detect a resource selection trigger in a slot;
perform, within a sensing window that starts a period of time after the slot in which the resource selection trigger is detected, a full-sensing operation to obtain results;
select sidelink transmission resources based on the results; and
output sidelink data, via the interface circuitry, for transmission in the sidelink transmission resources.

13. The apparatus of claim 12, wherein the sensing window is a full sensing window and, to perform the full-sensing operation, the processing circuitry is to cause the apparatus to sense all subchannels of a sidelink resource pool for the full sensing window to obtain the results.

14. The apparatus of claim 13, wherein the processing circuitry is further to:
receive configuration information to configure a duration of the full sensing window.

15. The apparatus of claim 13, wherein the period of time is based on user equipment (UE) preparation for sensing of the subchannels in the full-sensing operation.

16. The apparatus of claim 15, wherein to select the sidelink transmission resources, the processing circuitry is further to:
select the sidelink transmission resources in a resource selection window that starts a number of slots from an end of the full sensing window, wherein the number of slots is based on a UE processing time for selecting the sidelink transmission resources and preparing for transmitting of the sidelink data.

17. The apparatus of claim 13, wherein the processing circuitry is further to: determine the full sensing window duration based on a latency requirement associated with the sidelink data.

18. The apparatus of claim 13, wherein the results are first results and the processing circuitry is further to:
perform the periodic partial-sensing operation to obtain second results; and
select the sidelink transmission resources based further on the second results.

19. A method comprising:
operating in a first mode that is a periodic partial sensing mode;
switching, based on detection of a resource selection trigger in a slot, from the first mode to a second mode that is a full-sensing mode;
sensing, within a sensing window that starts a period of time after the slot, subchannels of a sidelink resource pool in the full-sensing mode to obtain results; and
selecting, based on the results, sidelink transmission resources for transmission of sidelink data.

20. The method of claim 19, wherein the sensing window is a full sensing window and the method further comprises:
sensing, while in the full-sensing mode, all subchannels of the sidelink resource pool for the full sensing window to obtain the results.

* * * * *